(12) United States Patent
Bowman et al.

(10) Patent No.: US 10,949,205 B2
(45) Date of Patent: Mar. 16, 2021

(54) IMPLEMENTATION OF EXECUTION COMPRESSION OF INSTRUCTIONS IN SLICE TARGET REGISTER FILE MAPPER

(71) Applicant: International Business Machines Corporation, Armonk, NY (US)

(72) Inventors: Joshua Bowman, Austin, TX (US); Dung Q. Nguyen, Austin, TX (US); Hung Le, Austin, TX (US); Brian Thompto, Austin, TX (US); Maureen A. Delaney, Burlington, VT (US); Cliff Kucharski, Austin, TX (US); Steven J Battle, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 62 days.

(21) Appl. No.: 16/226,793

(22) Filed: Dec. 20, 2018

(65) Prior Publication Data

US 2020/0201639 A1 Jun. 25, 2020

(51) Int. Cl.
*G06F 3/00* (2006.01)
*G06F 9/30* (2018.01)
*G06F 9/48* (2006.01)

(52) U.S. Cl.
CPC ........ *G06F 9/30141* (2013.01); *G06F 9/3012* (2013.01); *G06F 9/30032* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 6,094,716 A | 7/2000 | Witt | |
| 6,594,754 B1 | 7/2003 | Jourdan et al. | |
| 9,292,288 B2 | 3/2016 | Kadgi et al. | |
| 9,311,084 B2 | 4/2016 | Sundar et al. | |
| 9,575,754 B2 | 2/2017 | Keller et al. | |
| 9,823,925 B2 | 11/2017 | Khartikov et al. | |
| 2012/0005459 A1* | 1/2012 | Fleischman | G06F 9/384 712/216 |
| 2013/0275720 A1* | 10/2013 | Keller | G06F 9/384 712/205 |
| 2014/0281432 A1* | 9/2014 | Anderson | G06F 9/384 712/226 |
| 2016/0026463 A1 | 1/2016 | Sundar | |
| 2017/0185410 A1 | 6/2017 | Abernathy et al. | |

* cited by examiner

*Primary Examiner* — Henry Tsai
*Assistant Examiner* — Dean Phan
(74) *Attorney, Agent, or Firm* — Cantor Colburn LLP; Bryan Bortnick

(57) ABSTRACT

A computer system includes a dispatch routing network to dispatch a plurality of instructions, and a processor in signal communication with the dispatch routing network. The processor determines a move instruction from the plurality of instructions to move data produced by an older second instruction, and copies a splice target file (STF) tag from a source register of the move instruction to a destination register of the move instruction without physically copying data in a slice target register and without assigning a new STF tag destination to the move instruction.

20 Claims, 11 Drawing Sheets

Table 1

| Free | Aliased | Notes |
|---|---|---|
| 1 | 0 | STF tag is not in-use |
| 0 | 0 | STF tag is allocated to its first instruction |
| 0 | 1 | STF tag is used in a zero-cycle move as a source, now assigned to two instructions |
| 1 | 1 | STF tag is freed by a completion from Save and Restore Buffer; STF still not available for reuse because It is aliased. |
| 1 | 0 | STF tag is freed a second time by completing from Save and Restore Buffer; can now be reused by a new instruction |

FIG. 9

Table 2

| ITAG | Instruction | Type | Notes |
|---|---|---|---|
| 0x0 | CNT ⇐ G0 | 0-cycle Move | First use of G0 and CNT |
| 0x1 | LNK ⇐ G0 | Multi-cycle Move | Reusing G0 |
| 0x2 | G2 ⇐ CNT | Multi-cycle Move | Reusing CNT |
| 0x3 | G0 ⇐ G1 + G2 | Add | Assigning new tag to G0 |
| 0x4 | TAR ⇐ G0 | 0-Cycle Move | First use of TAR, first use of G0 after new tag assignment |

FIG. 10

IMPLEMENTATION OF EXECUTION COMPRESSION OF INSTRUCTIONS IN SLICE TARGET REGISTER FILE MAPPER

BACKGROUND

The present invention relates to computer processing systems, and more specifically, to a computing system that processes move instructions to move data between logical registers.

Digital computing systems utilize "move instructions" to move data from one address space to another address space. Some computing system also use move instructions to move data from one register to another register. The source or destination of the data could be a general-purpose register (GPR), floating point register (FPR), vector register (VSR), or a special-purpose register (e.g. Count Register, Link Register).

SUMMARY

According to a non-limiting embodiment, a computer system comprises a dispatch routing network configured to dispatch a plurality of instructions, and a processor in signal communication with the dispatch routing network. The processor is configured to detect a move instruction from the plurality of instructions to move data produced by an older second instruction, and copies a splice target file (STF) tag from a source register of the move instruction to a destination register of the move instruction without physically copying data in a slice target register and without assigning a new STF tag destination to the move instruction.

According to another non-limiting embodiment, a method is provided to execute a move instruction in a computer system. The method comprises determining, via a dispatch routing network, that at least one received instruction is a move instruction to move data from a source register to a destination register, and broadcasting, via the dispatch routing network, the move instruction to an issue queue and a splice target file (STF) mapper. The method further comprises determining, via the STF mapper, the source register of the move instruction and a source STF tag of the source register; and copying, via the STF mapper, the source STF tag into the destination register.

According to still another non-limiting embodiment, a computer program product is provided. The computer program product includes a computer readable storage medium having program instructions embodied therewith. The program instructions are executable by a computer processor to cause the computer processor to perform a method of executing a move instruction in a computer system. The method comprises determining, via a dispatch routing network, that at least one received instruction is a move instruction to move data from a source register to a destination register, and broadcasting, via the dispatch routing network, the move instruction to an issue queue and a splice target file (STF) mapper. The method further comprises determining, via the STF mapper, the source register of the move instruction and a source STF tag of the source register; and copying, via the STF mapper, the source STF tag into the destination register.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

FIG. 9 is a truth table indicating a status of an STF tag based on the states of the free list bit ("free") and the shared bit ("shared") according to a non-limiting embodiment;

FIG. 10 is a table illustrating a sample instruction stream according to a non-limiting embodiment.

DETAILED DESCRIPTION

Figure 1:
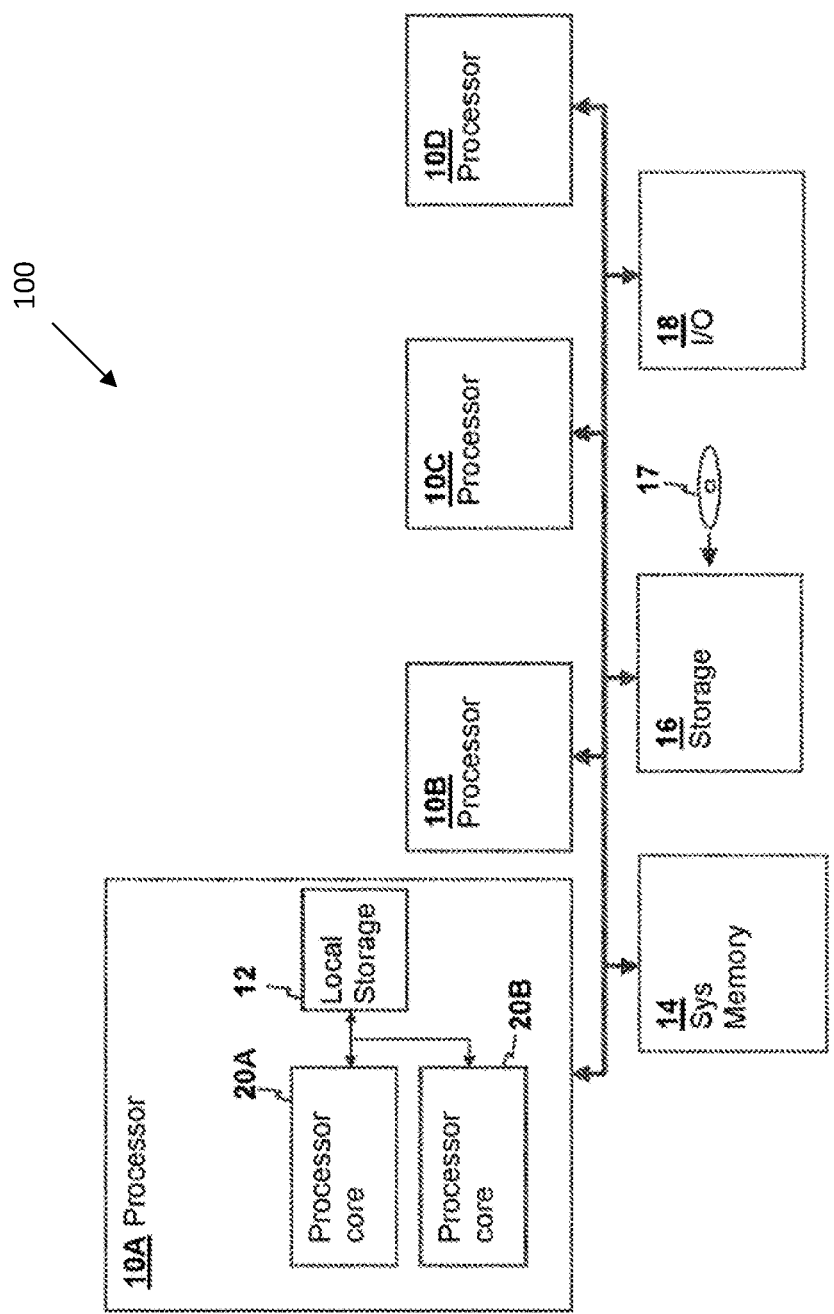
FIG. 1 is a block diagram illustrating a computer system which is capable of executing a move instruction in zero cycles according to a non-limiting embodiment.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more relevant to move instruction processing operations, conventional computing systems implement logical registers that can be assigned to any execution unit to perform a write operation at dispatch time. As a result, a logical register in a conventional computing system can be written by any of the execution units, resulting in a large register file with numerous write back ports. The large number of write back ports can lead to a large register file design while also requiring the computing system to consume an excessive amount of power. Furthermore, current move instruction processing strategies implemented in known computing systems perform a full-latency move, which requires several cycles to read and write the actual data from one register to another. This full-latency move reduces the processing speeds of the computing system while increasing undesirable power consumption.

Various non-limiting embodiments of the present teachings provide a computing system capable of executing move instructions (i.e., instruction that move data between one register to another) without using a cycle, referred to herein as a "zero-cycle" move operation. A zero-cycle move operation is achieved by executing the instruction without physically reading or writing data from or to the slice target register file. In this manner, move instructions can be executed with zero cycle latency for faster execution of programs.

In at least one embodiment, the computing system implements a class of instructions that do not perform arithmetic operations, for example. Instead, these instructions aim to direct the movement of data from a source register to a destination register. This type of instruction or class of instructions are referred to herein as "move instructions." Therefore, instead of assigning a move instruction a unique destination and writing data thereto when executing the instruction, the system shares a register between the move instruction and another instruction (e.g., an arithmetic instruction, which utilizes one or more computing cycles upon execution). In this manner, the system can simply execute a move instruction without using a cycle to read/write data associated with the move instruction.

In at least one embodiment, the computing system includes a splice target file (STF) mapper that manages STF register tags (STF tag) that act as pointers to data in the STF array. The STF mapper is logically a table which maps logical registers (e.g. GPRs) to the instruction that produces the result (tagged with an instruction tag—ITAG) and the location the data will be written to (STF tag)). The STF mapper supports a zero-cycle move operation that allows data to be moved from one register to another in "zero cycles" by copying the STF tag and ITAG from the move instruction source register mapping to the destination register mapping without physically copying data in the slice target register. Accordingly, up to two instructions can be assigned to the same STF tag, which effectively achieves a zero cycle latency execution using STF tag pointer movements.

With reference now to FIG. 1, a block diagram illustrates a computer processing system 100 capable of executing a move instruction in zero cycles according to a non-limiting embodiment. The depicted processing system 100 includes a number of processors 10A-10D, each which can have multi-threaded cores. The processors 10A-10D can be identical in structure and include cores 20A and 20B and a local storage 12, which may be a cache level, or a level of internal system memory. Processors 10A-10B are coupled to the main system memory 14, a storage subsystem 16, which includes non-removable drives and optical drives, for reading media such as a CD-ROM 17 forming a computer program product and containing program instructions implementing generally, at least one operating system, associated applications programs, and optionally a hypervisor for controlling multiple operating systems' partitions for execution by processors 10A-10D. The illustrated processing system also includes input/output (I/O) interfaces and devices 18 such as mice and keyboards for receiving user input and graphical displays for displaying information. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2:
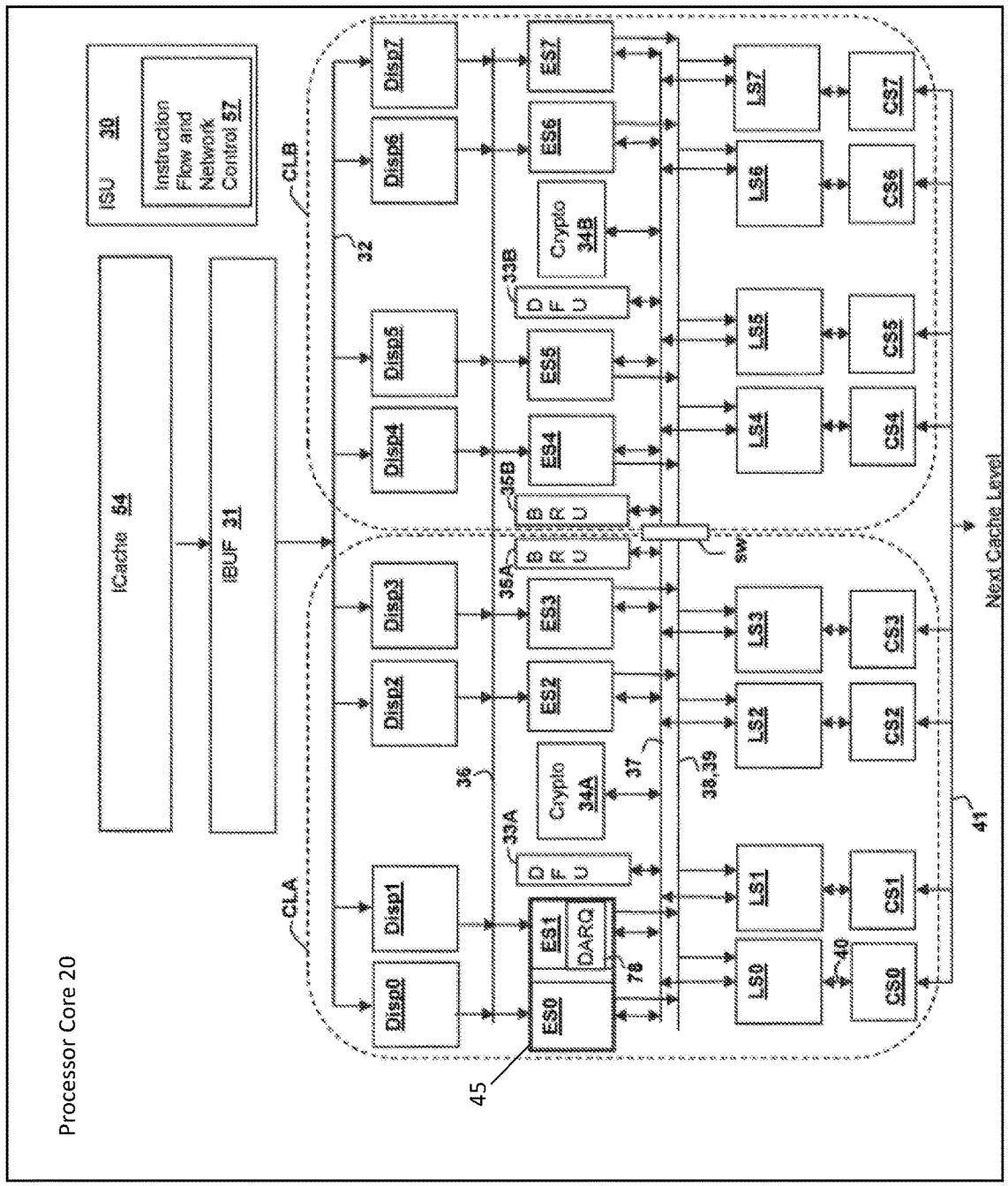
FIG. 2 is a block diagram of a processor core according to a non-limiting embodiment.
Figure 3:
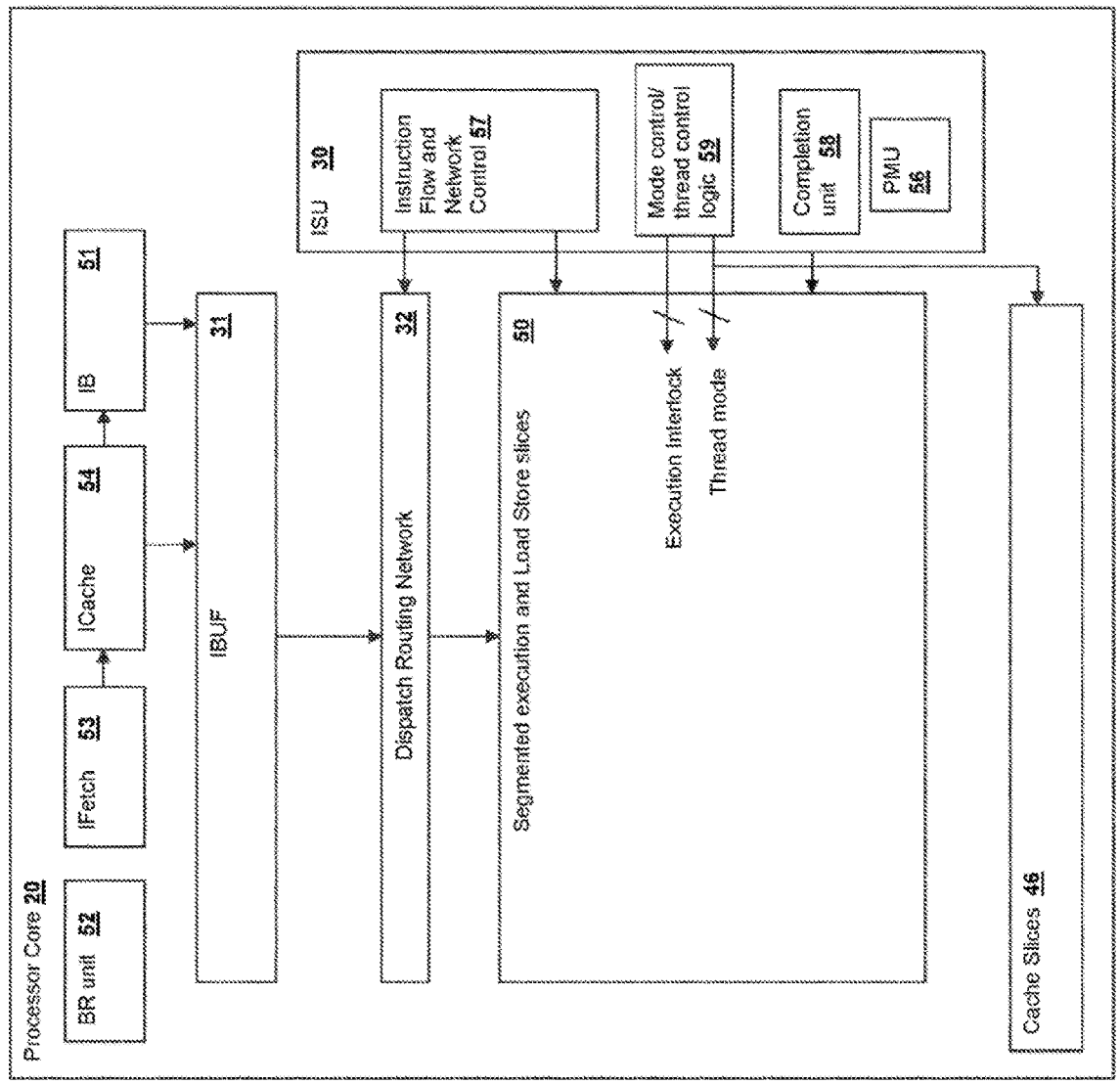
FIG. 3 is a block diagram of illustrating an instruction sequence unit (ISU) included in a processor core according to a non-limiting embodiment.

Referring to FIG. 2, a processor core 20 is illustrated according to a non-limiting embodiment. The Processor core 20 includes an instruction cache (ICache) 54 and instruction buffer (IBUF) 31 that store multiple instruction streams fetched from cache or system memory and present the instruction stream(s) via a dispatch routing network 32 to a plurality of dispatch queues Disp0-Disp7 within each of two clusters CLA and CLB. Control logic within processor core 20 controls the dispatch of instructions from dispatch queues Disp0-Disp7 to a plurality of instruction execution slices ES0-ES7 via a dispatch routing network 36 that permits instructions from any of dispatch queues Disp0-Disp7 to any of instruction execution slices ES0-ES7 in either of clusters CLA and CLB, although complete cross-point routing, i.e., routing from any dispatch queue to any slice is not a requirement of the invention. In certain configurations as described below, the dispatch of instructions from dispatch queues Disp0-Disp3 in cluster CLA will be restricted to execution slices ES0-ES3 in cluster CLA, and similarly the dispatch of instructions from dispatch queues Disp4-Disp7 in cluster CLB will be restricted to execution slices ES4-ES7. Instruction execution slices ES0-ES7 perform sequencing and execution of logical, mathematical and other operations as needed to perform the execution cycle portion of instruction cycles for instructions in the instruction streams, and may be identical general-purpose instruction execution slices ES0-ES7, or processor core 20 may include special-purpose execution slices ES0-ES7. Other special-purpose units such as cryptographic processors 34A-34B, decimal floating points units (DFU) 33A-33B and separate branch execution units (BRU) 35A-35B may also be included to free general-purpose execution slices ES0-ES7 for performing other tasks. Instruction execution slices ES0-ES7 may include multiple internal pipelines for executing multiple instructions and/or portions of instructions.

The load-store portion of the instruction execution cycle, (i.e., the operations performed to maintain cache consistency as opposed to internal register reads/writes), is performed by a plurality of load-store (LS) slices LS0-LS7, which manage load and store operations as between instruction execution slices ES0-ES7 and a cache memory formed by a plurality of cache slices CS0-CS7 which are partitions of a lowest-order cache memory. Cache slices CS0-CS3 are assigned to partition CLA and cache slices CS4-CS7 are assigned to partition CLB in the depicted embodiment and each of load-store slices LS0-LS7 manages access to a corresponding one of the cache slices CS0-CS7 via a corresponding one of dedicated memory buses 40. In other embodiments, there may not be a fixed partitioning of the cache, and individual cache slices CS0-CS7 or sub-groups of the entire set of cache slices may be coupled to more than one of load-store slices LS0-LS7 by implementing memory buses 40 as a shared memory bus or buses. Load-store slices LS0-LS7 are coupled to instruction execution slices ES0-ES7 by a write-back (result) routing network 37 for returning result data from corresponding cache slices CS0-CS7, such as in response to load operations. Write-back routing network 37 also provides communications of write-back results between instruction execution slices ES0-ES7. An address generating (AGEN) bus 38 and a store data bus 39 provide communications for load and store operations to be communicated to load-store slices LS0-LS7. For example, AGEN bus 38 and store data bus 39 convey store operations that are eventually written to one of cache slices CS0-CS7 via one of memory buses 40 or to a location in a higher-ordered level of the memory hierarchy to which cache slices CS0-CS7 are coupled via an I/O bus 41, unless the store operation is flushed or invalidated. Load operations that miss one of cache slices CS0-CS7 after being issued to the particular cache slice CS0-CS7 by one of load-store slices LS0-LS7 are satisfied over I/O bus 41 by loading the requested value into the particular cache slice CS0-CS7 or directly through cache slice CS0-CS7 and memory bus 40 to the load-store slice LS0-LS7 that issued the request. In the depicted embodiment, any of load-store slices LS0-LS7 can be used to perform a load-store operation portion of an instruction for any of instruction execution slices ES0-ES7, but that is not a requirement of the invention. Further, in some embodiments, the determination of which of cache slices CS0-CS7 will perform a given load-store operation may be made based upon the operand address of the load-store operation together with the operand width and the assignment of the addressable byte of the cache to each of cache slices CS0-CS7.

Instruction execution slices ES0-ES7 may issue internal instructions concurrently to multiple pipelines, e.g., an instruction execution slice may simultaneously perform an execution operation and a load/store operation and/or may execute multiple arithmetic or logical operations using multiple internal pipelines. The internal pipelines may be identical, or may be of discrete types, such as floating-point, scalar, load/store, etc. Further, a given execution slice may have more than one port connection to write-back routing network 37, for example, a port connection may be dedicated to load-store connections to load-store slices LS0-LS7, or may provide the function of AGEN bus 38 and/or data bus 39, while another port may be used to communicate values to and from other slices, such as special-purpose slices, or other instruction execution slices. Write-back results are scheduled from the various internal pipelines of instruction execution slices ES0-ES7 to write-back port(s) that connect instruction execution slices ES0-ES7 to write-back routing network 37. Cache slices CS0-CS7 are coupled to a next higher-order level of cache or system memory via I/O bus 41 that may be integrated within, or external to, processor core 20. While the illustrated example shows a matching number of load-store slices LS0-LS7 and execution slices ES0-ES7, in practice, a different number of each type of slice can be provided according to resource needs for a particular implementation.

Within processor core 20, an instruction sequencer unit (ISU) 30 includes an instruction flow and network control block 57 that controls dispatch routing network 36, write-back routing network 37, AGEN bus 38 and store data bus 39. Network control block 57 also coordinates the operation of execution slices ES0-ES7 and load-store slices LS0-LS7 with the dispatch of instructions from dispatch queues Disp0-Disp7. In particular, instruction flow and network control block 57 selects between configurations of execution slices ES0-ES7 and load-store slices LS0-LS7 within processor core 20 according to one or more mode control signals that allocate the use of execution slices ES0-ES7 and load-store slices LS0-LS7 by a single thread in one or more single-threaded (ST) modes, and multiple threads in one or more multi-threaded (MT) modes, which may be simultaneous multi-threaded (SMT) modes.

For example, in the configuration shown in FIG. 2, cluster CLA may be allocated to one or more hardware threads forming a first thread set in SMT mode so that dispatch queues Disp0-Disp3 only receive instructions of instruction streams for the first thread set, execution slices ES0-ES3 and load-store slices LS0-LS3 only perform operations for the first thread set and cache slices CS0-CS3 form a combined cache memory that only contains values accessed by the first thread set. Similarly, in such an operating mode, cluster CLB is allocated to a second hardware thread set and dispatch queues Disp4-Disp7 only receive instructions of instruction streams for the second thread set, execution slices ES4-ES7 and LS slices LS4-LS7 only perform operations for the second thread set and cache slices CS4-CS7 only contain values accessed by the second thread set. When communication is not required across clusters, write-back routing network 37 can be partitioned by disabling transceivers or switches (sw) connecting the portions of write-back routing network 37, cluster CLA and cluster CLB. Separating the portions of write-back routing network 37 provides greater throughput within each cluster and allows the portions of write-back routing network 37 to provide separate simultaneous routes for results from execution slices ES0-ES7 and LS slices LS0-LS7 for the same number of wires in write-back routing network 37. Thus, twice as many transactions can be supported on the divided write-back routing network 37 when switches (sw) are open.

Other embodiments of the invention may sub-divide the sets of dispatch queues Disp0-Disp7, execution slices ES0-ES7, LS slices LS0-LS7 and cache slices CS0-CS7, such that a number of clusters are formed, each operating on a particular set of hardware threads. Similarly, the threads within a set may be further partitioned into subsets and assigned to particular ones of dispatch queues Disp0-Disp7, execution slices ES0-ES7, LS slices LS0-LS7 and cache slices CS0-CS7. However, the partitioning is not required to extend across all of the resources listed above. For example, clusters CLA and CLB might be assigned to two different hardware thread sets, and execution slices ES0-ES2 and LS slices LS0-LS1 assigned to a first subset of the first hardware thread set, while execution slice ES3 and LS slices LS2-LS3 are assigned to a second subject of the first hardware thread set, while cache slices CS0-CS3 are shared by all threads within the first hardware thread set. In a particular embodiment according to the above example, switches may be included to further partition write back routing network 37 between execution slices ES0-ES7 such that connections between sub-groups of execution slices ES0-ES7 that are assigned to different thread sets are isolated to increase the number of transactions that can be processed within each sub-group. The above is an example of the flexibility of resource assignment provided by the bus-coupled slice architecture depicted in FIG. 2, and is not a limitation as to any particular configurations that might be supported for mapping sets of threads or individual threads to resources such as dispatch queues Disp0-Disp7, execution slices ES0-ES7, LS slices LS0-LS7 and cache slices CS0-CS7.

In another configuration, according to another state of the mode control signal(s), clusters CLA and CLB are configured to execute instructions for a common pool of threads, or for a single thread in an ST mode. In such a configuration, cache slices CS0-CS7 may be joined to form a larger cache that is accessible by instructions dispatched to any of execution slices ES0-ES7 via any of load-store slices LS0-LS7. Cache slices CS0-CS7 may be organized into a partitioned cache, for example by using the operand address of each cache operation to determine which of cache slices CS0-CS7 or sub-groups of cache slices CS0-CS7 should support an operation.

Cache lines may be split across sub-groups of cache slices CS0-CS3 and CS4-CS7, for example, such that a particular bit of the operand address selects which of the two groups of cache slices CS0-CS3 and CS4-CS7 will contain the specified value, forming an interleave of cache lines. For example, cache slices CS0-CS3 may store data values having odd cache line addresses and cache slices CS4-CS7 may store data values having even cache line addresses. In such a configuration, the number of unique cache lines addresses indexed within the cache may be held constant when selecting between modes in which the cache slices CS0-CS7 are partitioned among sets of threads and modes in which cache slices CS0-CS7 are joined. In another example, data may be "striped" across cache slices CS0-CS7 using three bits of the operand address to determine a target one of cache slices CS0-CS7, forming an interleave mapping with a factor of 8.

The above-illustrated examples are not exhaustive, and there are many different ways to assign data values to particular ones of cache slices CS0-CS7. For example, certain block or vector operations may deterministically span cache slices CS0-CS7 or sub-groups thereof, permitting early-decode-based assignment to one of execution slices ES0-ES7 or as among clusters CLA or CLB. Dispatch queues Disp0-Disp7 and/or execution slices ES0-ES7 may determine the appropriate target one (or more) of cache slices CS0-CS7 for an operation based on the operation type, address generation, a prediction structure, or other mechanisms. In one such exemplary embodiment of an operating mode, operations having odd operand addresses will be identified for processing on load-store slices LS0-LS3 only and cache slices CS0-CS3 are joined to only contain values representing odd addresses. Similarly, in such an exemplary embodiment of an operating mode, operations having even operand addresses are identified for processing by load-store slices LS4-LS7 only and cache slices CS4-CS7 only contain values representing even addresses.

In the above-described configuration, cache slices CS0-CS7 may be conceptually joined, however, certain implementations such as vector or cache block operations do not require a full cross-bar routing between all load-store slices LS4-LS7, execution slices ES0-ES7 and cache slices CS0-CS7. In other configurations according to other modes, and/or in other embodiments of the invention, cache slices CS0-CS7 may be further partitioned to support SMT operations with four, eight, etc., independent partitions available to pools of hardware threads, as the illustrated embodiment having eight execution slices, eight load-store slices and eight cache slices is only illustrative and larger numbers of slices or clusters may be present in other embodiments of the invention.

Still referring to FIG. 2, one or more of the execution slices ESX can be linked as a "super-slice." For example, execution slices ES0 and ES1 are linked as a "super-slice" 45 for executing an instruction that has operand width and/or operator width twice the width of instructions that are handled by execution slices ES0 and ES1 individually. It at least one example, execution slices ES0 and ES1 can have a 64-bit width and can be combined in a 128-bit super-slice 45 according to the state of a mode control signal. Such a configuration may be used for executing instructions having, for example, operands in vector pairs that are processed by the same instruction. Alternatively, or in combination, the operator may be a wider operator or may contain immediate fields requiring the extra width.

The super-slice configuration is not limited to pairs of execution slices. For example, three or more execution slices ES0-ES7 might be linkable to provide a still wider operand and/or operator handling. For the wider 128-bit wide operations, dispatch queues such as Disp0 and Disp1 may also be joined. Wider operations can also be routed from a single one of dispatch queues Disp0-Disp7 to more than one of execution slice ES0-ES7 over dispatch routing network 36. In such an embodiment, if a super-slice is not available to execute a wider operation, the wider operation may be blocked from dispatch and may be retained in the dispatch queue until a super-slice is available. Operations for other hardware threads that share the same dispatch queue can continue to be dispatched. Some wide operations, such as vector operations that do not require concurrent execution of each element of the vector, may be executed by a single execution slice, or a disjoint set of execution slices without requiring availability of a super-slice.

Figure 4:
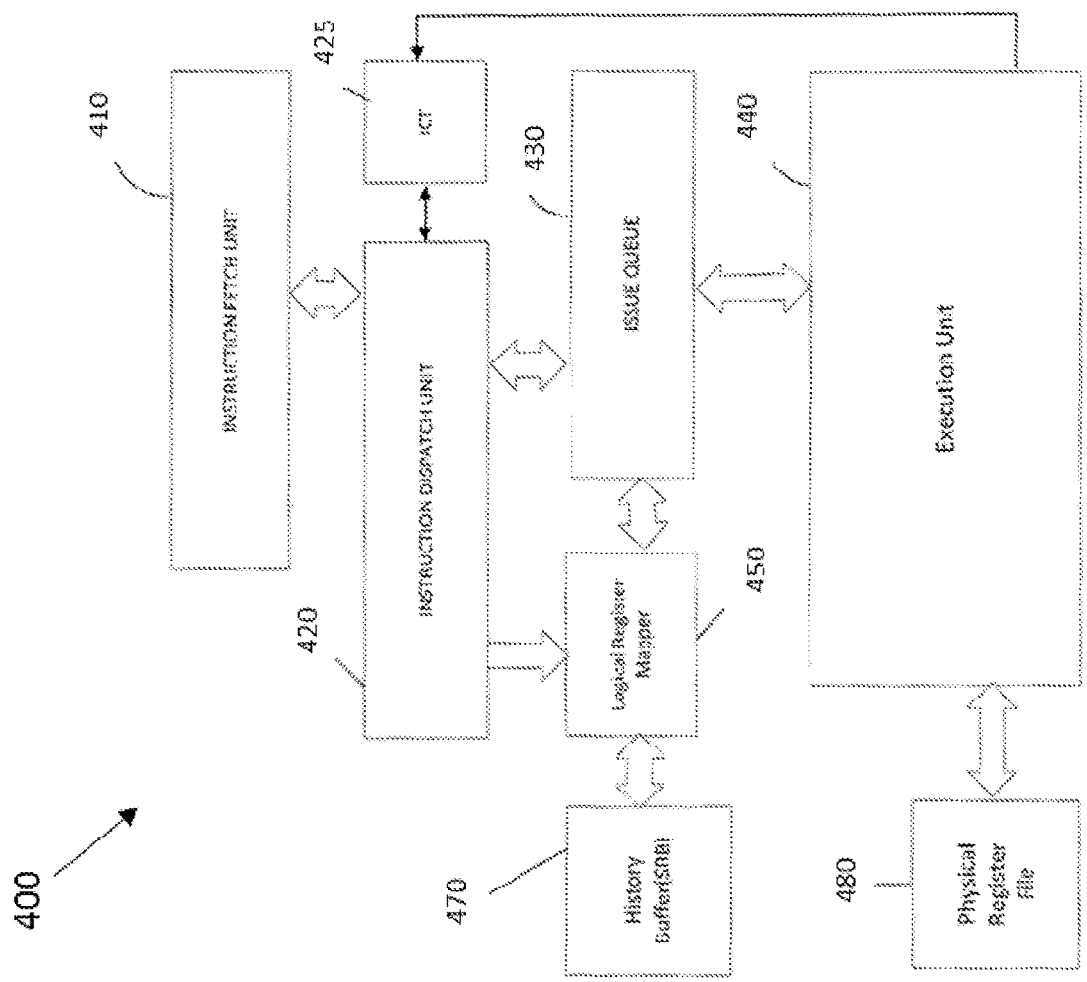
FIG. 4 is a block diagram illustrating details of an instruction execution slice that can be used to implement instruction execution slices.

Referring now to FIG. 4, an example pipeline 400 of an execution slice (ES) 45 that can be used to implement instruction execution slices ES0-ES7 in FIG. 2 is shown. The execution slice (ES) 45 includes an Instruction Fetch Unit 310, an Instruction Dispatch Unit 420, an Issue Queue (ISQ) 430, an Instruction Completion Table (ICT) 425, an Execution Unit 440, a Logical Register Mapper 450, a history buffer (SRB) 470, and a Slice Target Register File (STF) 480. The Execution Unit 440 may include one or more queues to hold instructions for execution by the Execution Unit 440.

The Instruction Fetch Unit 410 fetches instructions to be executed by the processor or processor slice and sends them to the Instruction Dispatch Unit 420. The Instruction Dispatch Unit 420 dispatches instructions to the Issue Queue (ISQ) 430, typically in program order. The Issue Queue (ISQ) 430 will issue instructions to the Execution Unit 440. The ISQ 430 typically holds an instruction until data associated with the instruction has been retrieved and ready for use. A physical register file 480 may serve to store data, for example, to be used in an operation specified in an instruction dispatched to an execution unit 440, and the result of the operation performed by the Execution Units 440 may be written to the designated target register entry in the physical register file 480.

When data is not ready, e.g., not within the appropriate data cache or register, delay can result as the ISQ 430 will not issue the instruction to the Execution Unit 440. For at least this reason, the Issue Queue (ISQ) 430 typically issues instructions to the Execution Units 440 out-of-order so instructions where the required data is available can be executed. Dispatch Unit 420 will stamp each instruction dispatched to the Issue Queue 430 with an identifier, e.g., identification tag (iTag), to identify the instruction. The Dispatch Unit 420 may stamp instructions with other information and metadata. The instructions (iTags) typically are allocated (assigned) and stamped in ascending program order on a per thread basis by the Dispatch Unit 420. Dispatch Unit 420 may also maintain a per thread instruction counter that increments for each instruction in a thread that is dispatched to the Issue Queue 430.

The Execution Unit 440 executes instructions out-of-order and when the Execution Unit 440 finishes an instruction, the Execution Unit 440 will send the finished instruction, e.g., iTag, to the ICT 325. The ICT 325 contains a queue of the instructions dispatched by the Dispatch Unit 420 and tracks the progress of the instructions as they are processed. In an embodiment, the ICT 325 has a completion tail pointer that keeps track of the progress of executing instructions in the thread, e.g., points to the next to complete instruction. The instruction entry in the ICT typically will not identify the instruction as complete until all older instructions in the thread are completed.

The STF Logical register mapper 450 contains metadata (e.g., iTag, STF tag, etc.) which provides a mapping between logical register entries (LReg) and entries in physical register file 480. The STF tag is the pointer that correlates a logical register entry (LReg) to a physical register file entry. For example, when an instruction wants to read a logical register, e.g., the logical register mapper 450 tells issue queue 430, execution unit 440 and or other unit, where in the physical register file 480 it can find the data, e.g., physical register array entry.

Figure 5:
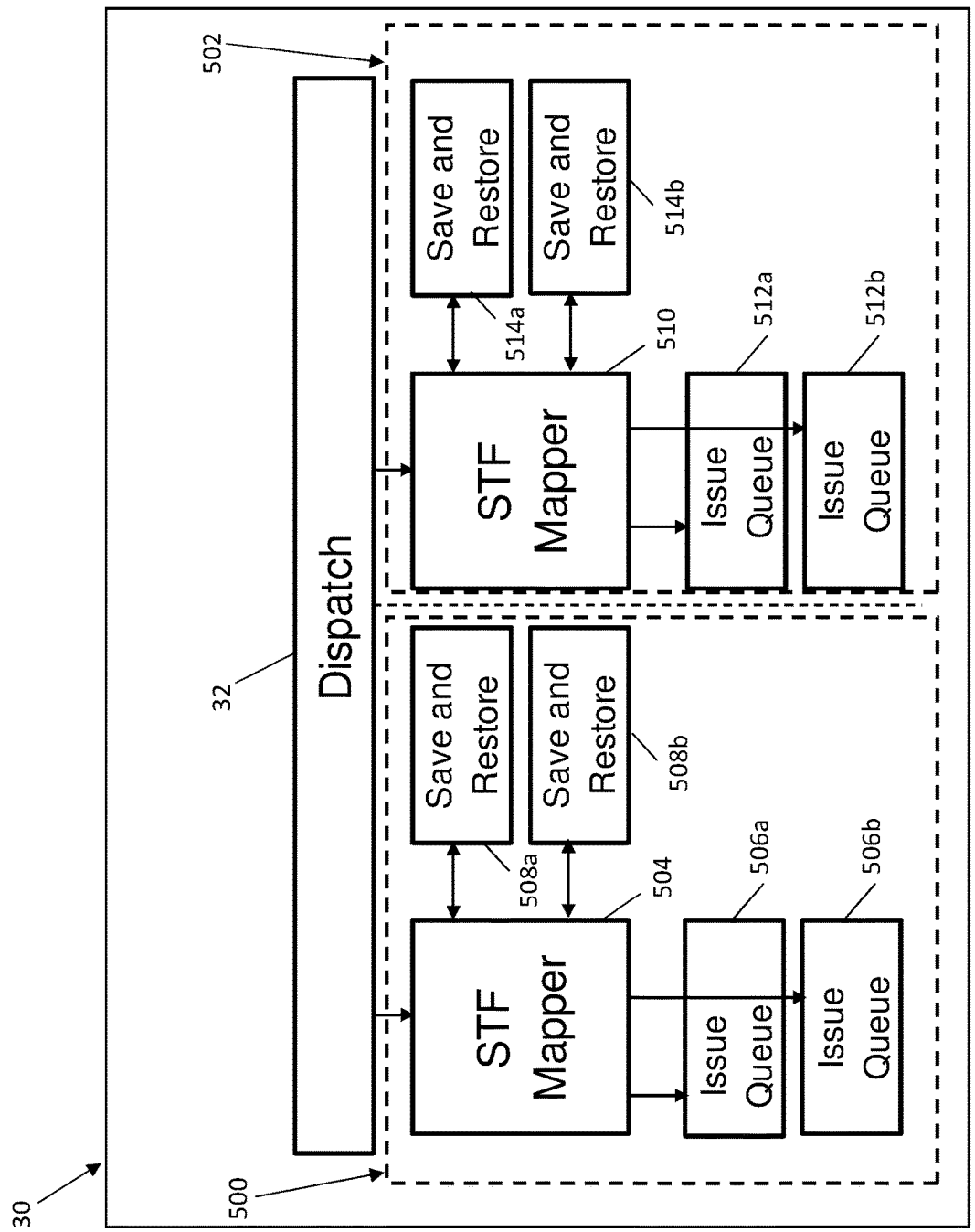
FIG. 5 is a block diagram of an ISU including two super-slices each having a splice target file (STF) mapper implemented therewith.

Turning now to FIG. 5, an ISU 30 including two super-slices 500 and 502 is illustrated according to a non-limiting embodiment. The two super-slices 500 and 502 are in signal communication with a dispatch routing network 32 to receive dispatched instructions. In at least one embodiment, the dispatch routing network 32 also outputs an instruction identification (ID). The instruction ID signal indicates the type or class of instruction that is dispatched. In this manner, dispatched instructions can be distinguished from one another. For example, a non-move instruction (e.g., an arithmetic instruction) can be distinguished from a move instruction.

A first super-slice 500 includes a first STF mapper 504, one or more issue queues 506a and 506b, and one or more save/restore units 508a and 508b. Similarly, the second super-slice 502 includes a second STF mapper 510, one or more issue queues 512a and 512b, and one or more save/restore units 514a and 514b. Although one super-slice 500 is described below, it should be appreciated that the second slice 502 can operate in the same manner.

Turning to the first super-slice 500, the STF mapper 504 includes several entries among a plurality of logical registers (not shown in FIG. 5). According to a non-limiting embodiment, the mapper 504 includes 198 entries among 99 logical registers across 2 threads. The entries include, for example, 32 general purpose registers (GPRs), 64 vector scalar registers (VSR), a count (CNT) register, a link (LNK) register, and a table access register (TAR) register.

The physical STF array, e.g., the storage array where data is stored, can be located inside a functional unit such as, for example, the vector-scalar unit (VSU). The physical STF array is broken into four 70-entry sub-blocks, for example. Each sub-block of the STF array has only two write ports and can therefore only be addressable by certain functional units.

During operation, the mapper 504 receives instructions from the dispatch routing network 32 and sends renamed instructions to one or more issue queues (ISQ) 506a, 506b. As described herein, the mapper 504 can identify a received move instruction based on the instruction ID provided by the dispatch routing network 32. The dispatched instructions can evict one or more given entries, and send the evicted entries to one or more of the save/restore units 508a, 508b. At restore time, entries that were evicted are restored to the mapper 504. For the sources, the mapper 504 lookups the data and sends the dependent ITAG and the STF tag along with the instructions to the ISQ 506a, 506b. The mapper 504 also looks up the destination of the instructions and sends instruction destination information to each respective save/restore unit 514a, 514b.

In at least one embodiment, an instruction will be assigned to an execution unit (not shown in FIG. 5) at dispatch, with a corresponding producer field (not shown in FIG. 5), which allows the mapper and issue queue writeback bus to determine from where the result will be returned. A producer field identifies which writeback bus shall broadcast the instruction writeback data to be stored in the STF register file (RF) block. The producer bit can also be used by the ISQs 506a, 506b to steer instructions to the appropriate execution units.

Figure 6:
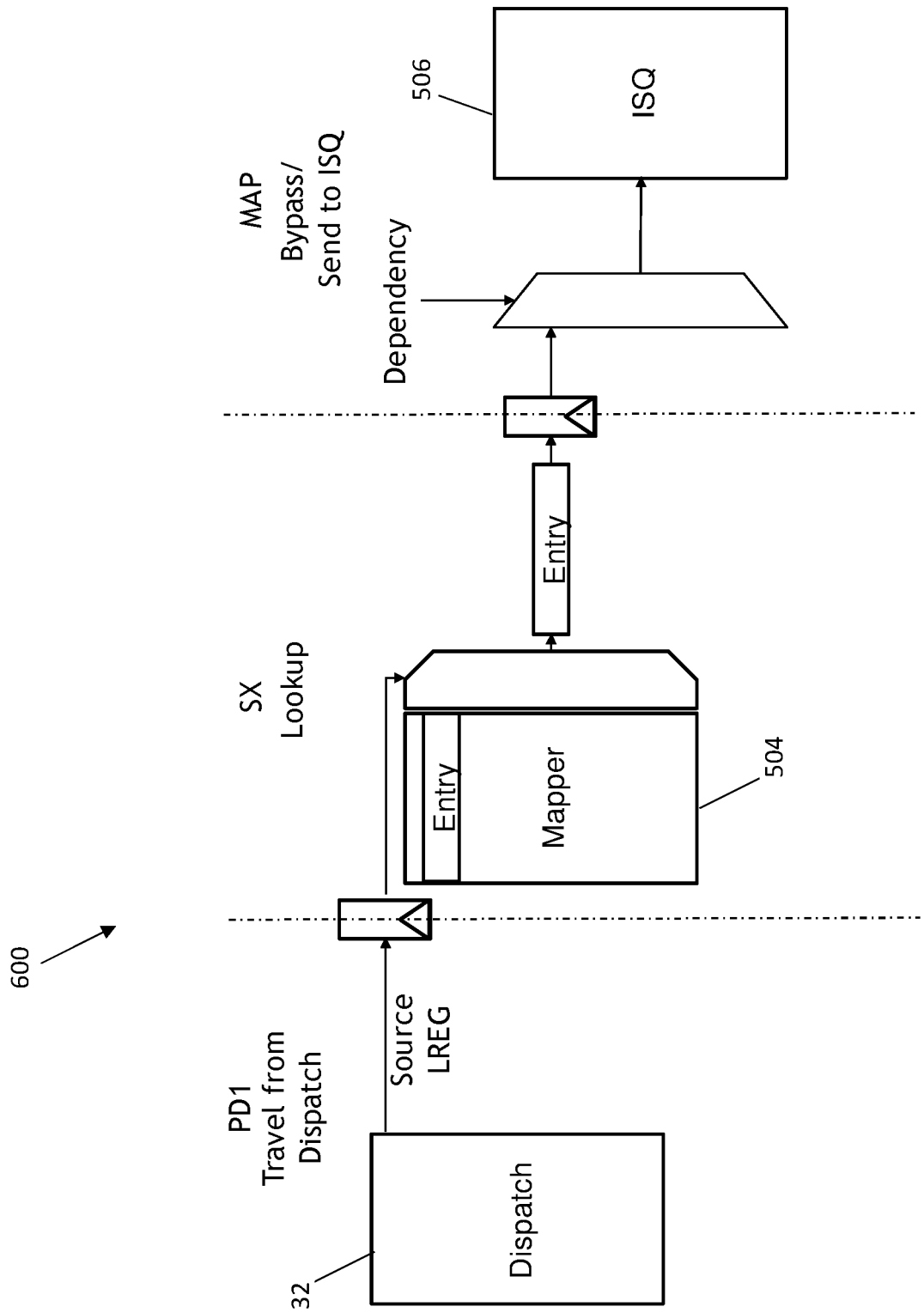
FIG. 6 is a block diagram illustrating a dispatch source read pipeline according to a non-limiting embodiment.

Turning to FIG. 6, a dispatch source read pipeline 600 is illustrated according to a non-limiting embodiment. The mapper 504 receives from dispatch routing network 32 source LREGs for dispatching instructions. These sources are used to access the mapper 504 and read out the current contents to be sent to the ISQ 506 to be used for dependency tracking. The STF tag is also read to identify where the source data can be read at issue time. The mapper 504 also accounts for same-cycle dependencies within a dispatch group and covers any writebacks that might occur by setting the ready bit while the mapper 504 is being read.

An example cycle of the dispatch source read pipeline 600 includes: (1) at the PD1 dispatch cycle, the dispatch routing network 32 sends LREGs for dispatching sources to the mapper 504 where it is immediately latched; (2) at the SX lookup cycle, the mapper 504 decodes LREG, qualifies with valid and reads corresponding sources from the mapper 504, and latches after completion of the read; and (3) at the MAP bypass/send cycle, the mapper 504 updates the previous entry read cycle to factor in same-cycle dependency checking, and the ready bit updates are sent to the ISQ 506 to be latched.

Figure 7:
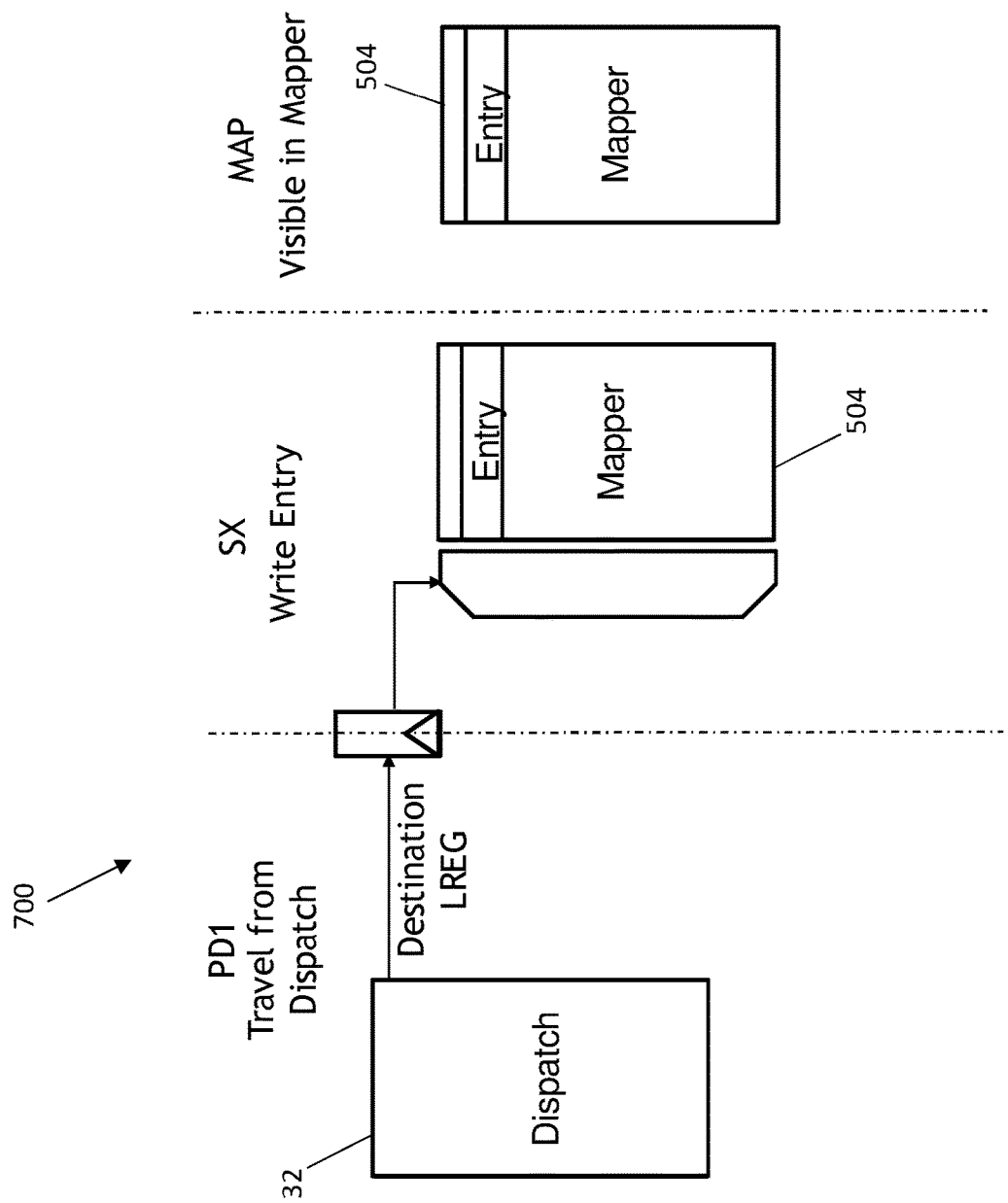
FIG. 7 is a block diagram illustrating a dispatch destination write pipeline according to a non-limiting embodiment.

Referring to FIG. 7, a dispatch destination write pipeline 700 is illustrated according to a non-limiting embodiment. In at least one embodiment, the mapper 504 receives the destination LREG for each dispatching instruction and writes all of the destinations (e.g., all 8 destinations) into the mapper 504 to keep the mappers across super-slices in sync. This LREG to select the entry to write and the entry is written with data for the dispatching instruction provided by the dispatch routing network 32.

An example cycle of the dispatch destination read pipeline 700 includes: (1) at the PD1 dispatch cycle, the dispatch routing network 32 sends LREG for dispatching destination to the mapper 504 where it is immediately latched; (2) at the SX write entry cycle, the mapper 504 decodes LREG, qualifies the decoded LREG, and writes corresponding sources from the mapper 504; and (3) at the MAP cycle, the written entry is visible in the mapper 504.

Figure 8:
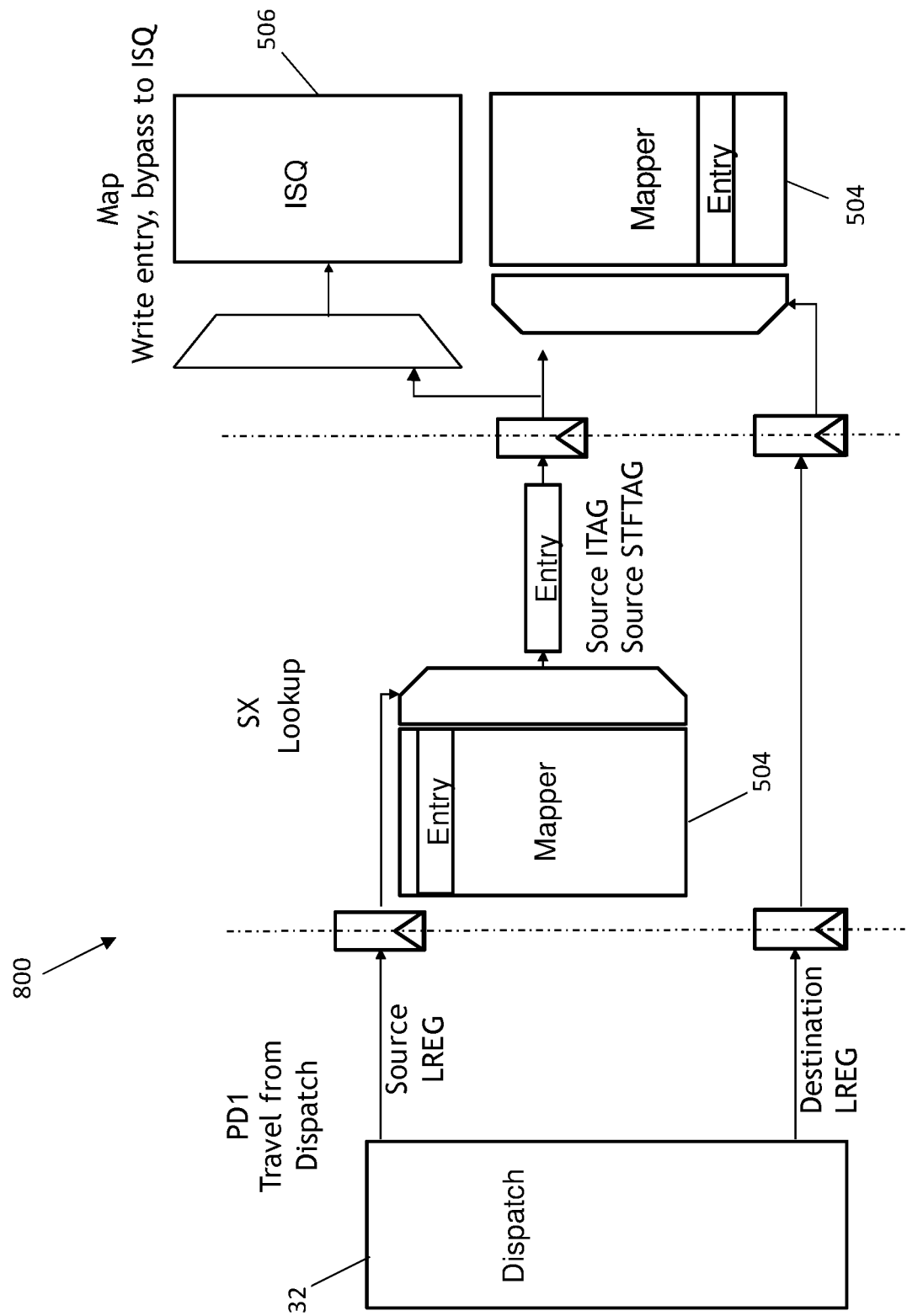
FIG. 8 is a block diagram illustrating a zero-cycle move instruction pipeline according to a non-limiting embodiment.

Referring to FIG. 8, a zero-cycle move instruction pipeline 800 is illustrated according to a non-limiting embodiment. The zero-cycle move instruction operation employs shared bits corresponding to the source logical register (LREG) and the destination LREG, respectively. At dispatch, the source logical register for a potential zero-cycle move instruction reads its shared bit. When the shared bit is not set, the instruction can be executed as a zero-cycle move. This will prevent any of the STF tags in the future from being used in a zero-cycle move. The source lookup is simpler since only a single source will be looked up per instruction rather than multiple sources, for example. Whenever an STF tag is assigned to a logical register, the shared bit for that entry will be set making it able to be used for a zero-cycle move.

An example cycle of the zero-cycle move instruction pipeline 800 includes: (1) at the PD1 dispatch cycle, the dispatch routing network 32 sends LREGs for dispatching sources and destinations to the mapper 504; (2) at the SX lookup cycle, the mapper 504 reads the source ITAG and STF tag from the source register before writing the read data into the destination register entry; (3) after reading the source ITAG and STF tag, the mapper 504 writes the analyzed data into the destination register entry. In at least one non-limiting embodiment, the STF tag of the zero-move instruction's source register is copied into its destination register. In at least one embodiment, the source information is bypassed into any instruction that wants to read this LREG.

The pipelines described herein facilitate the execution move instructions in zero cycles by allowing the STF mapper 504 to manage STF tags, which represent moveable data. For example, two registers that logically have the same data are mapped with the same STF tag pointer, such that both registers point to the same target data. This feature can be utilized to allow data to be moved from one register to another in "zero cycles" by copying the STF tag from the source register to the destination register without using issue and execution cycles to physically read/write the target data from its register. The STF mapper 504 supports this feature on all its managed logical registers.

Referring back to FIG. 5, to facilitate a zero-cycle move, the STF mapper 504 utilizes what are referred to herein as an "aliased" bit. The STF mapper 504 maintains the "free" state for each entry in the STF array by using a free-list and an aliased-list. The STF mapper utilizes the aliased bit to manage multiple instructions being assigned to an STF tag.

The aliased bit is an additional bit per free list entry that indicates when an STF tag is in use by a second instruction. On the first assignment of an STF tag, the normal free list bit is cleared and the aliased bit is unchanged. On the second assignment (after a zero-cycle move) the aliased bit is set to 1. The setting of this aliased bit first indicates that this STF tag has been aliased to a second instruction and can no longer be aliased again i.e. used by a zero-cycle move. The setting of this aliased bit also indicates that this STF tag must be freed twice, by two different instructions, to be re-allocated. If an STF tag is being used by two instructions, it cannot be reused until both users of the STF tag are freed. Providing the aliased bit includes performing two "free events" for the STF tag before it can be re-allocated. The truth table (Table 1) illustrated in FIG. 9 indicates the status of an STF tag based on the states of the free list bit ("free") and the aliased bit ("aliased").

The STF mapper 504 utilizes a "shared" bit to indicate if a logical register has been shared by a register-to-register move instruction. Each entry in the STF mapper has a "shared" bit. While the previously described "aliased" list indicates which STF array entries are aliased (or shared), the shared bit indicates which logical registers are shared.

An STF tag is deallocated (freed) when it is no longer needed in the system to preserve the architectural state. That is, an instruction (e.g. ITAG 1) that targets a register (e.g. GPR0) will release its tag (e.g. STFTAG 15) when that data is not needed anymore. When a younger instruction completes (e.g. ITAG 2) and targets the same register (GPR0), and has a new STF tag (e.g. STFTAG 45), the machine does not need to keep the GPR0 result from ITAG1, and can release STFTAG 15. ITAG 2 is the new architected result for GPR0, so that the STF tag resource assigned to ITAG1 can be freed. Two of these events must occur before a zero-cycle aliased STF tag can be released.

The "aliased" bit is utilized by the STF mapper 504 to prevent the same STF tag from being over-allocated. The STF tag supports being shared by one zero-cycle move instruction. An embodiment can support "n" zero-cycle move instructions referencing the same source data by implementing "n" aliased bits. If the "aliased" bit is cleared (e.g., is "0") it will block the STF tag from being used again.

At dispatch, the STF mapper 504 accesses the dispatching mapper source entry to determine if the entry can be used for a zero-cycle move. When a zero-cycle move scenario is determined, the STF mapper 504 copies the STF tag of the zero-cycle move instruction from its source register to its destination register and will finish the instruction. This finish operation will share a finish port with the dispatch routing network 32. The STF mapper 504 will send an indication in the MAP cycle to completion logic that will be combined with the dispatch finish port to finish the instruction. The STF mapper 504 will also send a signal to the issue queue to clear the instruction, since it does not need to be issued to an execution unit. When the entry does not qualify for a zero-cycle move, the STF mapper 504 will not finish the operation. Instead, based off the status of the shared bit, the STF mapper 504 assigns the instruction a new physical register tag (rather than copying the STF tag of the zero-cycle move instruction from its source register to its destination register) and then sends the instruction to the ISQ 506a, 506b as normal.

The source logical register for a potential zero-cycle move instruction operates in conjunction with the STF mapper 504 and reads the logical register shared bit at dispatch. If the shared bit is not already set, the instruction can be executed as a zero-cycle move. Once the zero-cycle move operation is initiated, the shared bit will be set in both the source logical register and the destination logical register of the zero-cycle move. This will prevent any of the STF tags in the future from being allowed to be a zero-cycle move. Whenever an STF tag is assigned to a logical register, the shared bit for that entry will be set making it able to be used for a zero-cycle move.

As described herein, a flush and restore operation can be performed so that the STF tags are quickly re-used to avoid bottlenecks at the dispatch routing network 32. When performing the flush and restore operation, the shared bit is sent to the save/restore unit 508a, 508b when an entry is overwritten, and is restored on flush to the STF mapper 504. It is possible that one the logical register users of an STF tag that is marked as shared would be flushed while the other is not. Accordingly, the shared bit may be cleared for this single user of the STF tag. The free list aliased bit is correctly updated by the deallocation of the flush but the shared bit is not.

In at least one non-limiting embodiment, the zero-cycle move operation allows for a set number of instruction moves for the same physical register tag. The number of instruction moves is based on the number of bits to have in the STF free list to support the multiple deallocations required for a STF tag being used multiple times. In at least one embodiment, the STF mapper 504 has an additional single shared bit per logical entry and an aliased bit per STF entry. The STF mapper 504 has knowledge of this additional bits, and can decide when an instruction move is available for a zero-cycle move.

Referring to FIG. 10, a table (TABLE 2) illustrates a sample instruction sequence to perform the zero-cycle move according to a non-limiting embodiment. The sample instruction sequence illustrates an example as to how the STF mapper 504 can determine whether or not a given move instruction is available for a zero-cycle move. In at least one embodiment, once a register is used as the source or destination in a zero-cycle move, it cannot be used again as the source of a zero-cycle move again until it has been overwritten again by a non-zero-cycle move (i.e. assigned a new physical register tag).

The example instruction sequence begins by executing move 0x0, which is an ITAG move from GPR0 to the "count" special purpose register. Initially, neither G0 nor CNT are shared. The STF mapper reads the GPR0 source STF tag and ITAG and writes it into the mapper entry for CNT, and sets the shared bit for CNT and G0 logical register entries. The GPR0 source STF tag alias bit is set to 1. The second instruction, ITAG 0x1, is a move from GPR0 to "link" special purpose register. GPR0 is already shared, so this move cannot be 'zero-cycled', and must execute as a normal "multi-cycle" move. Accordingly, the LNK register is assigned a new STF tag pointer, resetting the "free" bit in the free-list to "0". The third instruction, ITAG 0x2, is a move from CNT to GPR2. This is also a multi-cycle move (i.e., a non-zero cycle move instruction), because the STF tag pointer assigned to CNT is already shared with GPR0. The STF tag cannot be shared again with GPR2. Instruction 4, ITAG 0x3, is not a move (i.e., is a non-move instruction). Therefore, ITAG 0x3 produces a new result for GPR0 which will be stored in a new STF tag. This new STF tag is able to be aliased by ITAG 0x4, a move from GPR0 to TAR special purpose register. ITAG 0x4 is zero-cycle moved and assigned the same STF tag as ITAG 0x3.

Figure 11:
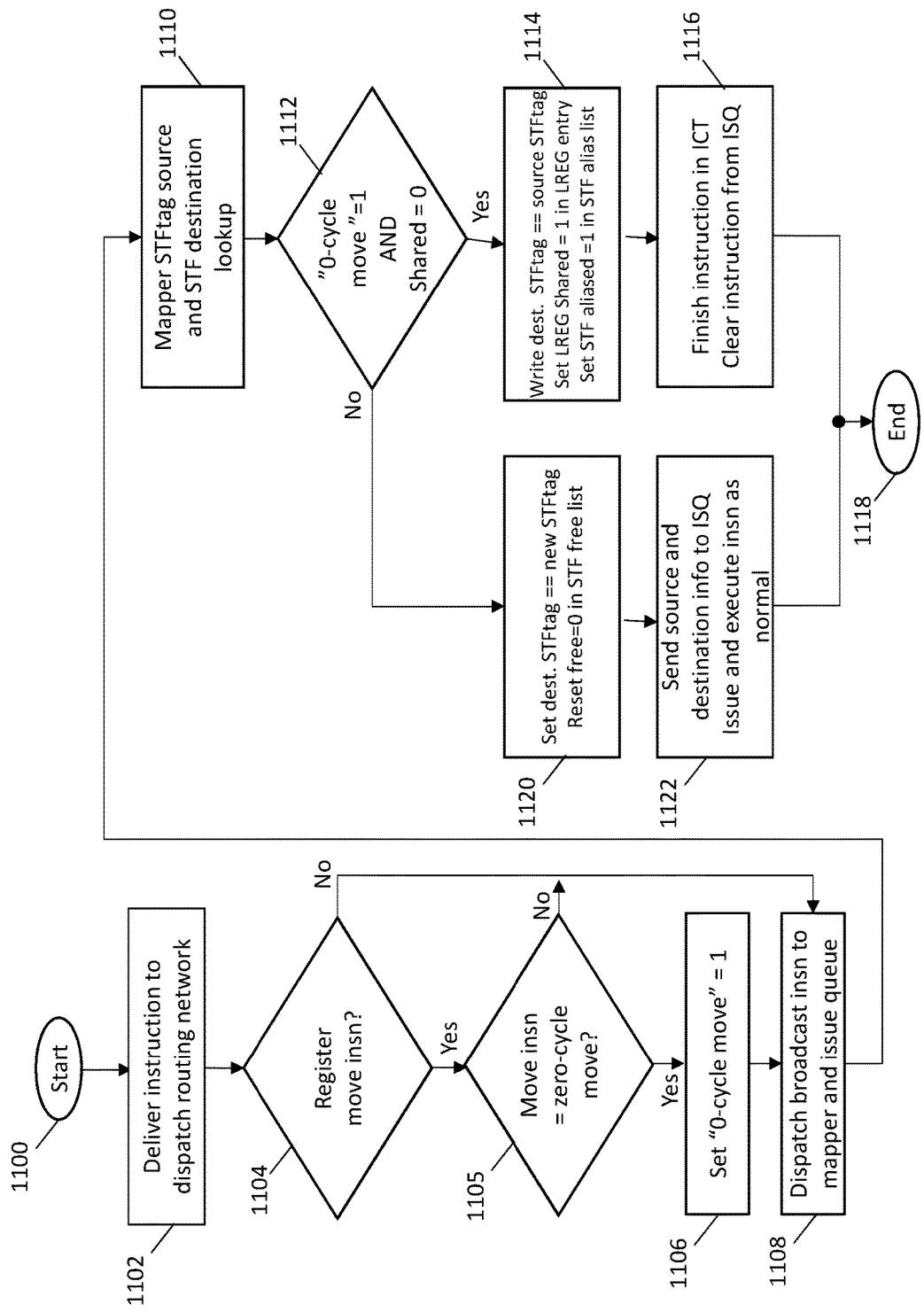
FIG. 11 is a flow diagram illustrating a method of performing a zero-cycle move operation.

Turning now to FIG. 11, a method of performing a zero-cycle move operation is illustrated according to a non-limiting embodiment. The method begins at operation 1100, and an instruction is delivered to the dispatch routing network at operation 1102. At operation 1104, the dispatch routing network determines whether the received instruction is a register move instruction (insn). When the instruction is a move instruction, the dispatch routing network further determines whether the move instruction is a zero-cycle move instruction at operation 1105. When a zero-cycle move instruction is detected, the dispatch routing network generates a zero-cycle move signal (e.g., "0-cycle move") at operation 1106. The zero-cycle move signal indicates that the subsequent broadcast instructions can be processed using a zero-cycle move operation. In other words, the zero-cycle move signal informs the mapper to perform the zero-cycle processing operations described in greater detail below. When, however, the instruction is neither a move instruction nor a zero-cycle move instruction, the dispatch routing network refrains from generating the zero-cycle move signal. Accordingly, the mapper can process the move instruction according to a traditional move operation. At operation 1108, the dispatch routing network broadcasts the instruction to the issue queue and the mapper, and the mapper determines the source STF tag and the destination STF tag assignment of the move instruction at operation 1110.

At operation 1112, the mapper checks the shared bit for the move instruction source logical register. The shared bit indicates whether the source is not already shared (e.g., shared bit=0) or is already shared (e.g., shared bit=1). When the source is not already shared (e.g., shared bit=0), the mapper writes the source STF tag into the destination register, and sets an aliased bit in the STF tag free list at operation 1114. At this stage, the source is now shared. Therefore, the mapper also sets the shared bit (e.g., shared bit=1). At operation 1116, the mapper generates completion data indicating that the move instruction has executed and completed in response to copying the source STF tag into the destination register. In at least one non-limiting embodiment, the mapper informs the instruction completion table that the move instruction has "executed" and is "finished" and the mapper informs the issue queue that move instruction has "executed" and is "finished such that the move instruction can be removed from the issue queue. Accordingly, the method ends at operation 1118.

When, however, the zero-cycle move signal is generated but the source is already shared (e.g., shared bit=1) at operation 1120, the mapper proceeds to operation 1120 and writes a new STF tag into the destination register rather than copying the STF tag from the source register into the destination register. The operation of writing the new STF tag includes clearing the free bit in the STF tag free list and delivering the source and destination STF tags to the issue queue. At operation 1122, the source and destination information is delivered to the issue queue and is executed as normal. For example, when the instruction issues the execution unit reads the source data from the STF array entry addressed by the source STF tag, and copies the data into the destination STF array addressed by the destination STF tag. Accordingly, the method ends at operation 1118.

As described herein, various non-limiting embodiments of the present teachings provide a computing system capable of executing move instructions (i.e., instruction that move data between one register to another) without using a cycle, referred to herein as a "zero-cycle" move operation. A zero-cycle move operation is achieved by remapping the destination register without executing the instruction and without physically copying data in the slice target register file. In this manner, move instructions can be executed with zero cycle latency for faster execution of programs, while using fewer unique register file destinations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
a dispatch routing network configured to dispatch a plurality of instructions;
a processor in signal communication with the dispatch routing network, the processor configured to determine a move instruction from the plurality of instructions to move data produced by an older second instruction, to determine whether a source register of the move instruction is shared with a destination register of the move instruction at a time the move instruction is dispatched in response to analyzing a shared bit included in the move instruction, and to perform a first move operation in response to the shared bit indicating the source register of the move instruction is not shared with a destination register and performing a different second move operation in response to the shared bit indicating the source register of the move instruction is shared with a destination register,
wherein the first move operation is a zero-cycle move operation that includes copying a splice target file (STF) tag from a source register of the move instruction to a destination register of the move instruction without physically copying data in a slice target register and without assigning a new STF tag destination to the move instruction.

2. The computer system of claim 1, wherein the move instruction is configured to be executed without assigning a unique write destination thereto.

3. The computer system of claim 2, wherein the move instruction is configured to be executed without writing data to the unique write destination.

4. The computer system of claim 3, wherein the move instruction is configured to be executed without reading source data.

5. The computer system of claim 4, wherein the older second instruction is configured to be executed using a write destination assigned thereto, and writing data to the write destination in response to executing the second instruction.

6. The computer system of claim 5, wherein the processor manages a plurality of registers having the same data to both point to a single STF tag that has correct data.

7. A method of executing a move instruction in a computer system, the method comprising:
determining, via a dispatch routing network, that at least one received instruction is a move instruction to move data from a source register to a destination register;
broadcasting, via the dispatch routing network, the move instruction to an issue queue and a splice target file (STF) mapper;
analyzing a shared bit included in the move instruction;
determining whether the source register is shared with the destination register at the time the move instruction is dispatched based on the shared bit; and
performing a first move operation in response to the shared bit indicating the source register of the move instruction is not shared with a destination register; and
performing a different second move operation in response to the shared bit indicating the source register of the move instruction is shared with a destination register,
wherein the first move operation is a zero-cycle move operation that includes:
determining, via the STF mapper, the source register of the move instruction and a source STF tag of the source register; and
copying, via the STF mapper, the source STF tag into the destination register.

8. The method of claim 7, wherein the source STF tag is copied into the destination register without using issue and execution cycles of the computer system.

9. The method of claim 8, further comprising generating, via the mapper, instruction completion data indicating that the move instruction has executed and completed in response to copying the source STF tag into the destination register.

10. The method of claim 9, further comprising generating, via the dispatch routing network, a zero-cycle move signal in response to detecting the move instruction to inform the mapper that the move instruction is eligible for a zero-cycle move process.

11. The method of claim 10, wherein the mapper copies the source STF tag into the destination register based at least in part on the zero-cycle move signal.

12. The method of claim 11, wherein the mapper copies the source STF tag into the destination register based at least in part on the zero-cycle move signal and a shared bit associated with the source register, the shared bit set to a first value in response to the source register not being shared and a second value in response to the source register being shared.

13. The method of claim 12, wherein the mapper copies the source STF tag into the destination register in response to receiving the zero-cycle move signal and detecting the first value of the shared bit.

14. The method of claim 13, wherein the mapper writes a new source tag into the destination register in response to receiving the zero-cycle move signal and detecting the second value of the shared bit.

15. A computer program product to control a computer system to perform a move instruction operation, the computer program product comprising a computer readable storage medium having program instructions embodied therewith, the program instructions executable by an electronic computer processor to control the computer system to perform operations comprising:
determining, via a dispatch routing network, that at least one received instruction is a move instruction to move data from a source register to a destination register;
broadcasting, via the dispatch routing network, the move instruction to an issue queue and a splice target file (STF) mapper;
analyzing a shared bit included in the move instruction;
determining whether the source register is shared with the destination register at the time the move instruction is dispatched based on the shared bit; and
performing a first move operation in response to the shared bit indicating the source register of the move instruction is not shared with a destination register; and
performing a different second move operation in response to the shared bit indicating the source register of the move instruction is shared with a destination register,
wherein the first move operation is a zero-cycle move operation that includes:
determining, via the STF mapper, the source register of the move instruction and a source STF tag of the source register; and copying, via the STF mapper, the source STF tag into the destination register.

16. The computer program product of claim 15, wherein the source STF tag is copied into the destination register without using issue and execution cycles of the computer system.

17. The computer program product of claim 16, further comprising generating, via the mapper, instruction completion data indicating that the move instruction has executed and completed in response to copying the source STF tag into the destination register.

18. The computer program product of claim 17, further comprising generating, via the dispatch routing network, a zero-cycle move signal in response to detecting the move instruction to inform the mapper that the move instruction is eligible for a zero-cycle move process, wherein the mapper copies the source STF tag into the destination register based at least in part on the zero-cycle move signal.

19. The computer program product of claim 18, wherein the mapper copies the source STF tag into the destination register based at least in part on the zero-cycle move signal and a shared bit associated with the source register, the shared bit set to a first value in response to the source register not being shared and a second value in response to the source register being shared.

20. The computer program product of claim 19, wherein the mapper copies the source STF tag into the destination register in response to receiving the zero-cycle move signal and detecting the first value of the shared bit, and wherein the mapper writes a new source tag into the destination register in response to receiving the zero-cycle move signal and detecting the second value of the shared bit.

* * * * *